(12) United States Patent
Carr

(10) Patent No.: US 7,058,803 B2
(45) Date of Patent: Jun. 6, 2006

(54) SYSTEM AND METHOD FOR PROTECTING TRANSPORT STREAM CONTENT

(75) Inventor: Jeffrey Douglas Carr, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 826 days.

(21) Appl. No.: 10/153,338

(22) Filed: May 22, 2002

(65) Prior Publication Data

US 2003/0219125 A1    Nov. 27, 2003

(51) Int. Cl.
*G06F 1/26* (2006.01)

(52) U.S. Cl. .................. 713/153; 713/160; 713/161; 713/165; 713/168

(58) Field of Classification Search ............... 713/153, 713/160, 161, 165, 168, 200, 201
See application file for complete search history.

(56) References Cited

U.S. PATENT DOCUMENTS

| | | | | |
|---|---|---|---|---|
| 5,892,900 A | * | 4/1999 | Ginter et al. ................. 726/26 |
| 5,917,912 A | * | 6/1999 | Ginter et al. ................ 713/187 |
| 6,061,451 A | | 5/2000 | Muratani et al. ........... 380/201 |
| 6,134,591 A | * | 10/2000 | Nickles ....................... 709/229 |
| 6,157,721 A | * | 12/2000 | Shear et al. ................. 380/255 |
| 2002/0044656 A1 | | 4/2002 | Candelore ................... 380/201 |

FOREIGN PATENT DOCUMENTS

| EP | 0 714 204 | 5/1996 |
|---|---|---|
| EP | 1 176 826 | 1/2002 |
| WO | WO 01/22724 | 3/2001 |
| WO | WO 01/65762 | 9/2001 |

OTHER PUBLICATIONS

P.J. Lenior, "Functional Model for the DVB CPCM Framework," Royal Philips Electronics Presentation, Feb. 2002.
Rowan Vevers, "DVB Sub-Group on Commercial Requirements for Copy Protection Systems Report to the Eighteenth Meeting of the DVB Commercial Module (DVB-CM)," DVB Report, DVB-CP8(00)7, Oct. 2000.
Jeff Carr, "Response to DVB Call for Information Copy Protection and Digital Rights Management Technologies," Broadcom Corp., Oct. 2001.
"Call for Proposals for Content Protection & Copy Management Technologies," DVB, DVB Technical Module Sub-Group on Copy Protection Technologies, DVB CPT rev 1.2, Jul. 2001.

(Continued)

*Primary Examiner*—Thomas R. Peeso
(74) *Attorney, Agent, or Firm*—McAndrews, Held & Malloy, Ltd.

(57) ABSTRACT

Systems and methods that protect transport stream content are disclosed. The system may include a first module and a second module, the first module having a common interface. The second module is coupled to the first module via the common interface. In one embodiment, the first module is a set top box, and the second module is a conditional access card. In one example, the first module demodulates an incoming transport stream, copy protection encrypts the demodulated transport stream and passes the copy protection encrypted transport stream to the second module via the common interface. The second module copy protection decrypts the transport stream received from the first module, conditional access decrypts at least some of packets of the transport stream that were conditional access encrypted, copy protection encrypts the transport stream and passes the copy protection encrypted transport stream to the first module via the common interface.

21 Claims, 5 Drawing Sheets

OTHER PUBLICATIONS

Ji et al., "Open Letter following Proposal DVB-CPY-719," Feb. 2002.

"SCTE Proposed Standard Head-end Implementation of OpenCAS™," Society of Cable Telecommunications Engineers, Inc., Engineering Committee, Digital Video Subcommittee, SCTE DVS 278r1, Jul. 2000.

"Data-Over-Cable Interface Specification," MCNS Holdings, L.P., Security Systems Specification, SP-SSI-I01-970506, 1997.

"DES CBC Packet Encryption," General Instrument Corp., SCTE DVS/042, Nov. 1996.

"CD-Rom Based Application Software Consumer and SOHO Copying Trends," Merrill Research Associates, Apr. 2000.

"White Paper—The Ins and Outs of Content Delivery Networks," Stardust.com inc., Dec. 2000.

"CD-Rom Unauthorized Copying Study Executive Summary," Merrill Research Associates, Apr. 1999.

"UDAC-M Host Link Specification, Part 1: Overview," Keitaide-Music Consortium, Ver. 0.9, Dec. 2000.

"Keitaide-Music Technical Specification Part I Overview," Keitaide-Music Consortium, Ver. 1.0, Dec. 2000.

"EPRS8 White Paper," SecureMedia, Inc., 2000.

William Raike "Detailed Supplemental Technical Description of the RPK Public-Key Cryptographic System," 1996.

Joseph M. Winograd, "Audio Watermarking Technologies for Protection of Digital Audio and Video—Presentation to DVD CPTWG," Verance Corporation, Sep. 2000.

John Paddleford, "Digital Rights Management—Protecting Your Content," Microsoft Corporation, undated.

"Common Interface Specification For Conditional Access and Other Digital Video Broadcasting Decoder Applications," DVB, DVB Document A017, May 1996.

"Call for Proposals for Content Protection & Copy Management Technologies," DVD, DVB Technical Module Sub-Group on Copy Protection Technologies, Rev. 1.2, Jul. 2001.

Bechtolsheim et al., "Responses to DVB-CP Requirements (DVB-CM283) for the OCCAM Open Conditional Content Access Management System," Cisco Systems, Inc. Oct. 2001.

"NetDRM Technology Response to DVD Call for Proposals for Content Protection & Copy Management Technologies," DVD, Matsushita Electric Industrial Co., Ltd., Oct. 2001.

"Proposal for Content Protection & Copy Management Technologies submitted to DVB (Digital Video Broadcasting," Veridian, Oct. 2001.

"Response to the DVB-CPT Call for Proposals for Content Protection & Copy Management Technologies," Royal Phillips Electronics N.V., Oct. 2001.

Kish et al., "An Information Paper in Response to the Call for Proposals Issued by the DVB Copy Protection Technologies Sub-Group of the DVB Technical Module," VWM Companies, Oct. 2001.

"Proposals for Content Protection and Copy Management Technologies," Sony International (Europe), Oct. 2001.

Olsthoorn et al., "Flexcop—A Flexible Copy Protection Framework," Flexcop, undated.

"Proposals for DVB Content Protection & Copy Management Technologies," Nokia, Version 1.0, Oct. 2001.

"4C Entity Response to DVB CPT Call for Proposals Regarding Content Protection & Copy Management Technologies—Content Protection System Architecture—A Comprehensive Framework for Content Protection, with CPPM and CPRM Technologies," 4C Entity, LLC, Oct. 2001.

"SmartRight Answer to the Call for Proposals for Content Protection & Copy Management Technologies," Thomson Multimedia et al., Oct. 2001.

"Answer to Call for Proposals for Content Protection & Copy Management Technologies," Thales Communication, Oct. 2001.

"IBM Response to DVB CPT Call for Proposals Regarding Content Protection & Copy Management: xCP Cluster Protocol," IBM, Oct. 2001.

"Digital Transmission Licensing Administrator's (DTLA) Response to DVB-CPT Call for Proposals Concerning Content Protection & Copy Management Technologies Protected Transport of Commercial Entertainment Content Using DTCP Technology," DTLA, 2001.

Winograd et al., "Audio Watermarking System for Content Protection within a DVB CPCM Environment," Verance Corporation, Oct. 2001.

"Proposed Baseline DVB-CPCM Response to DVB-CPT Call for Proposal Concerning Content Protection & Copy Technologies," Matsushita Electric Industrial Co., Ltd., Oct. 2001.

"Response to the Call for Proposals Content Protection and Copy Management Technologies by DVB Copy Protection Technologies Sub-Group of DVB Technical Module," Pioneer Corporation, Oct. 2001.

Kudumais, et al., "OPIMA/OCCAMM: A Solution to DVB Call for Proposals for Content Protection & Copy Management Technologies," OCCAMM, undated.

Capitant et al., "Digital Rights Management & Copy Protection An Information Paper in Response to the Call for Proposals Issued by the DVB Copy Technologies Sub-Group of the DVB Technical Module," Macrovision Corporation and Widevine Technologies Oct. 2001.

"Content Protection System Architecture A Comprehensive Framework for Content Protection, with High-Bandwidth Digital Content Protection (HDCP) Technology," Digital Content Protection, LLC, Oct. 2001.

"Digimarc Response to DVB_CPCM CFP: Watermarking Applications Information Paper," Digimarc Corporation, Oct. 2001.

Agnelli et al., "LAN Interconnection Via ATM Satellite Links for CAD Applications: The UNOM Experiment," undated.

Löytänä et al., "Session Management Problems in Narrowband Interactive Services," Ad Hoc Group on Systems for Interactive Services, undated.

"Presentation to the TM," Simulcrypt Technical Group, undated.

"The DVB Project Promotion and Communication Module," DVB Project Office, Digital Video Broadcasting Presentation, undated.

"Digital Video Broadcasting (DVB); Support for Use of Scrambling and Digital Broadcasting Systems," European Telecommunications Standards Institute, ETSI Technical Report ETR 289, Oct. 1996.

"Digital Video Broadcasting (DVB); DVB SimulCrypt; Part 1: Head-end architecture and synchronization," European Telecommunications Standards Institute, ETSI Technical Report TS 101 197-1 v1.1.1 Jun. 1997.

"IPsec Processing," Microsoft Corporation et al, 1998.

"IPsec Databases," Microsoft Corp. Document, undated.

* cited by examiner

US 7,058,803 B2

SYSTEM AND METHOD FOR PROTECTING TRANSPORT STREAM CONTENT

FIELD OF THE INVENTION

The present invention generally relates to systems and methods that protect transport stream content and, more specifically, to systems and methods that protect unscrambled transport stream content.

BACKGROUND OF THE INVENTION

A receiver and, in particular, a set top box generally receives information signals that have been scrambled and information signals that have not been scrambled (i.e., clear information signals). An example of a clear information signal is a network television broadcast signal. Current laws and regulations may prohibit the scrambling of network television broadcast signals. Accordingly, there is a risk that the network television broadcast signal which is received by the set top box may be stored or re-routed outside of the set top box, resulting in possibly unauthorized broadcasting, streaming or copying of the network television broadcast signals.

What is needed is a system or a method that protects transport stream content, even transport stream content that has not been scrambled.

SUMMARY OF THE INVENTION

The present invention may provide systems and methods that protect transport stream content. The system may include a first module and a second module, the first module having a common interface. The second module is coupled to the first module via the common interface. The first module demodulates an incoming transport stream, copy protection encrypts the demodulated transport stream and passes the copy protection encrypted transport stream to the second module via the common interface. The second module copy protection decrypts the transport stream received from the first module, conditional access decrypts at least some of packets of the transport stream that were conditional access encrypted, copy protection encrypts the transport stream and passes the copy protection encrypted transport stream to the first module via the common interface.

The present invention may also provide systems and methods that protect transport stream content. The system may include a first module and a second module, the first module having a common interface. The second module is coupled to the first module via the common interface. The first module demodulates an incoming transport stream, copy protection encrypts packets of the demodulated transport stream that were not conditional access encrypted and passes the copy protection encrypted packets and the conditional access encrypted packets of the transport stream to the second module via the common interface. The second module conditional access decrypts at least some of the packets of the transport stream that were conditional access encrypted, copy protection encrypts the packets of the transport stream that were conditional access decrypted and passes the transport stream to the first module via the common interface.

The present invention may provide an advantage in that packets of the transport stream that pass through the common interface, which may be user accessible, are either copy protection encrypted or conditional access encrypted. Thus, a user could not tap or re-route, via the common interface, packets that were not encrypted.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
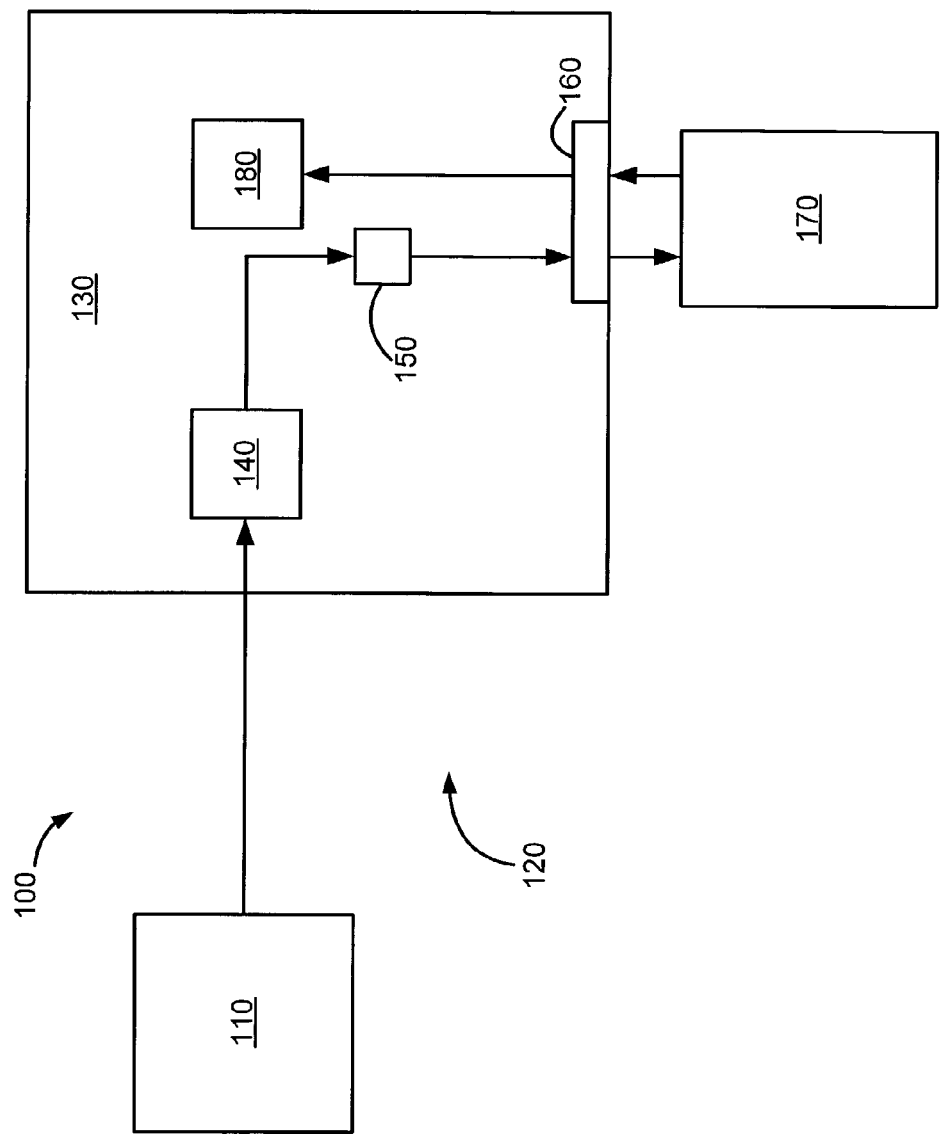
FIG. 1 shows a block representation of an example of a conditional access system according to the present invention.

FIG. 1 shows a block representation of an example of a conditional access system 100 according to the present invention. The conditional access system 100 may include, for example, a head-end module 110 and a receiver module 120. The head-end module 110 is coupled to the receiver module 120 via a communication media that is wired (e.g., cables, landline networks, terrestrial networks, etc.); wireless (e.g., satellite signals, radio frequency (RF) signals, cellular signals, personal communications services (PCS) signals, infrared (IR) signals, etc.); or some combination thereof.

The receiver module 120 may comprise, for example, a set top box 130. The set top box 130 may include, for example, a demodulator 140, a copy protection encryption unit 150, a common interface 160, a conditional access card 170 and a transport processor 180. The set top box 130 may include other components that are not shown or described here but are known to one of ordinary skill in the art. In addition, the set top box 130 may be coupled to an output device (e.g., a display, a screen, a monitor, a storage device, a printer, etc.) or other devices that are also known to one of ordinary skill in the art.

The head-end module 110 is coupled to the demodulator 140 of the set top box 130. The demodulator 140 is coupled to the copy protection encryption unit 150. The copy protection encryption unit 150 is coupled to the conditional access card 170 via the common interface 160. The conditional access card 170 is coupled to the transport processor 180 via the common interface 160. The present invention contemplates that the common interface 160 may be integrated, at least in part, with one or more of the above-described components or may be a separate module.

The conditional access card 170 may be, for example, a personal computer memory card international association (PCMCIA) card, a smart card, an interface card or a printed circuit board, that is plugged into, mounted on or integrated with the set top box 130 via the common interface 160 which may be accessible by the user or the subscriber. In particular, the conditional access card 170 may be, for example, a common interface card or a point of deployment (POD) module.

In operation, the head-end module 110, for example, managed by the content provider, may provide content to, for example, subscribers located at the receiver module 120. The content may be scrambled via, for example, a conditional access encryption unit of the head-end module 110, to protect against unauthorized access (e.g., by a non-subscriber, by a limited-access subscriber, etc.) However, federal laws may prohibit the content provider from scrambling all content provided to the receiver module 120. For example, federal laws may prohibit the scrambling of network television broadcast signals. Accordingly, the transport stream provided by the head-end module 110 to the receiver module 120 may include scrambled packets and unscrambled packets (i.e., clear packets). The transport stream is modulated and sent to the receiver module 120. The demodulator 140 of the set top box 130 demodulates the received transport stream and forwards the demodulated transport stream to the copy protection encryption unit 150.

In one embodiment, the present invention provides that the copy protection encryption unit 150 copy protection encrypts the entire demodulated transport stream. The copy encrypted transport stream is then sent to the conditional access card 170 via the common interface 160. The conditional access card 170 copy protection decrypts the entire demodulated transport stream and unscrambles the scrambled packets of the copy protection decrypted transport stream. The conditional access card 170 may unscramble all of the scrambled packets or may unscramble some of the scrambled packets (e.g., unscramble only those packets associated with a particular premium movie channel). The conditional access card 170 then copy protection encrypts the entire transport stream before sending the copy protection encrypted transported stream to the transport processor 180 via the common interface 160. The transport processor 180 may then copy protection decrypt the received transport stream before processing the transport stream. The further processing of the transport stream in the set top box 130 is known to one of ordinary skill in the art and is not described further herein.

In another embodiment, the present invention provides that the copy protection encryption unit 150 copy protection encrypts the clear packets within the demodulated transport stream. Whether a packet is clear or scrambled can be determined, for example, by a bit in a header portion of the packet. The transport stream, including copy protection encrypted packets and scrambled packets, is then sent to the conditional access card 170 via the common interface 160. The conditional access card 170 unscrambles the scrambled packets of the received transport stream. As described above, the conditional access card 170 may unscramble all of the scrambled packets or may unscramble some of the scrambled packets. The conditional access card 170 then copy protection encrypts the unscrambled packets of the transport stream before sending the copy protection encrypted transport stream to the transport processor 180 via the common interface 160. The transport processor 180 may then copy protection decrypt the copy protection encrypted packets of the received transport stream before processing the transport stream. As described above, the further processing of the transport stream in the set top box 130 is known to one of ordinary skill in the art and is not described further herein.

In the above-described embodiments, the present invention may provide that the packets of the transport stream that pass through the common interface 160 are either scrambled or copy protection encrypted. Thus, although the common interface 160 may be user accessible, a user could not obtain any clear or unscrambled packets at the common interface 160 and potentially tap or re-route the clear or unscrambled packets to a destination outside the set top box 130 resulting in, for example, unauthorized broadcasting, streaming or copying of clear or unscrambled packets of the transport stream.

Figure 2:
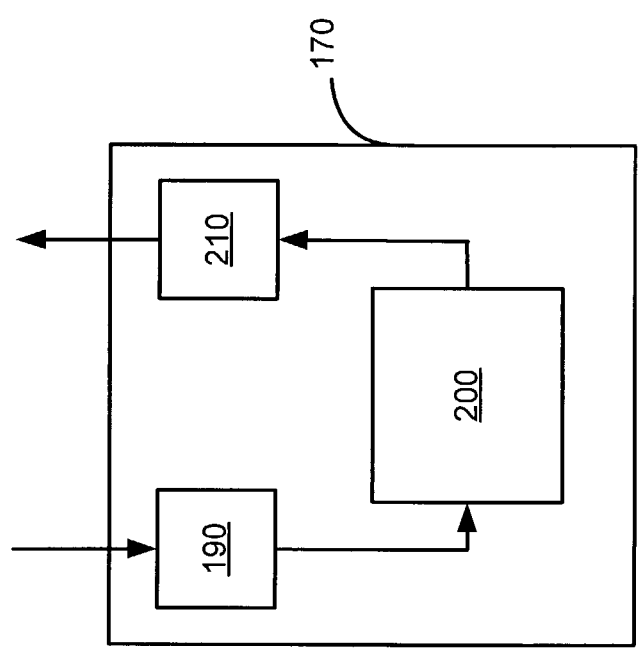
FIG. 2 shows a block representation of an example of a conditional access card according to the present invention.

FIG. 2 shows a block representation of an example of the conditional access card 170 according to the present invention. The conditional access card 170 may include, for example, a copy protection decryption unit 190, a conditional access decryption unit 200, and a copy protection encryption unit 210. The copy protection decryption unit 190 is coupled to the conditional access unit 200 which, in turn, is coupled to the copy protection encryption unit 210.

Figure 3:
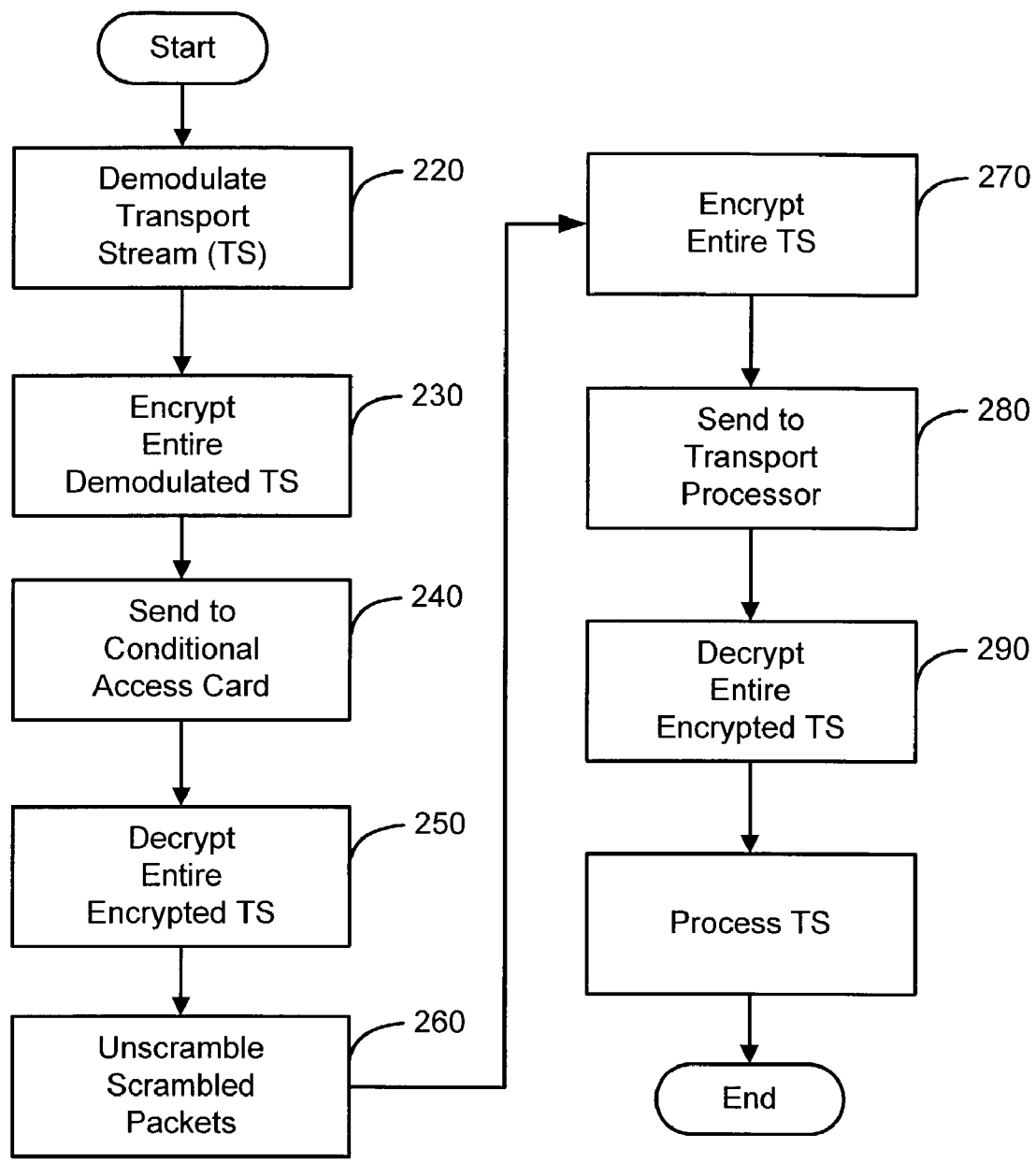
FIG. 3 shows a flowchart illustrating an example of a method that protects a transport stream according to the present invention.

FIG. 3 shows a flowchart illustrating an example of a method that protects a transport content stream according to the present invention. Referring to FIGS. 1–3, the process begins, in step 220, by demodulating the transport stream received by the demodulator 140 of the receiver module 120 from the head-end module 110. The demodulated transport stream is sent to the copy protection encryption unit 150. In step 230, the copy protection encryption unit 150 encrypts the entire demodulated transport stream and, in step 240, sends the copy protection encrypted transport stream to the conditional access card 170 via the common interface 160. In step 250, the copy protection decryption unit 190 of the conditional access card 170 copy protection decrypts the entire encrypted transport stream. In step 260, the conditional access decryption unit 200 decrypts (i.e., unscrambles) the conditional access encrypted packets (i.e., the scrambled packets) of the copy protection decrypted transport stream. The conditional access decryption unit 200 may unscramble all of the scrambled packets or may unscramble some of the scrambled packets (e.g., unscramble only those packets associated with a particular channel). In step 270, the copy protection encryption unit 210 then copy protection encrypts the entire transport stream before, in step 280, sending the copy protection encrypted transported stream to the transport processor 180 via the common interface 160. In step 290, the transport processor 180 then copy protection decrypts the received transport stream before processing the transport stream in step 300. Alternatively, step 290 may be performed by a separate copy protection decryption unit (not shown).

Figure 4:
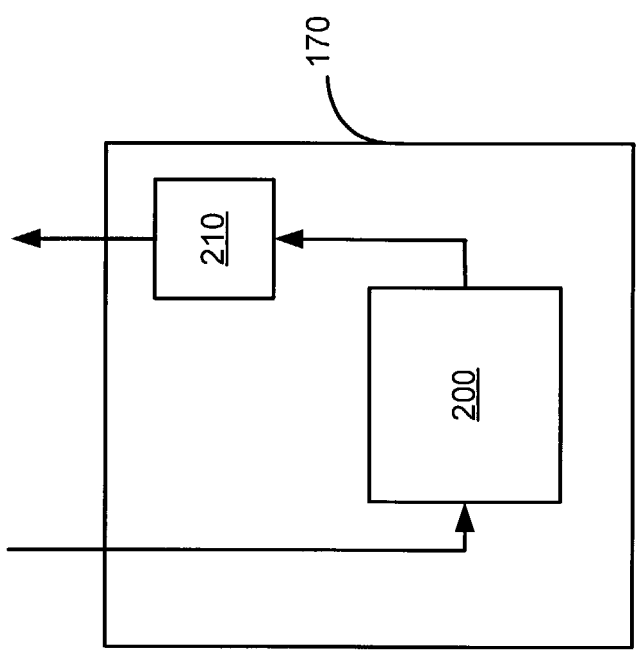
FIG. 4 shows a block representation of another example of a conditional access card according to the present invention.

FIG. 4 shows a block representation of another example of the conditional access card 170 according to the present invention. The conditional access card 170 may include, for example, the conditional access decryption unit 200 coupled to the copy protection encryption unit 210.

Figure 5:
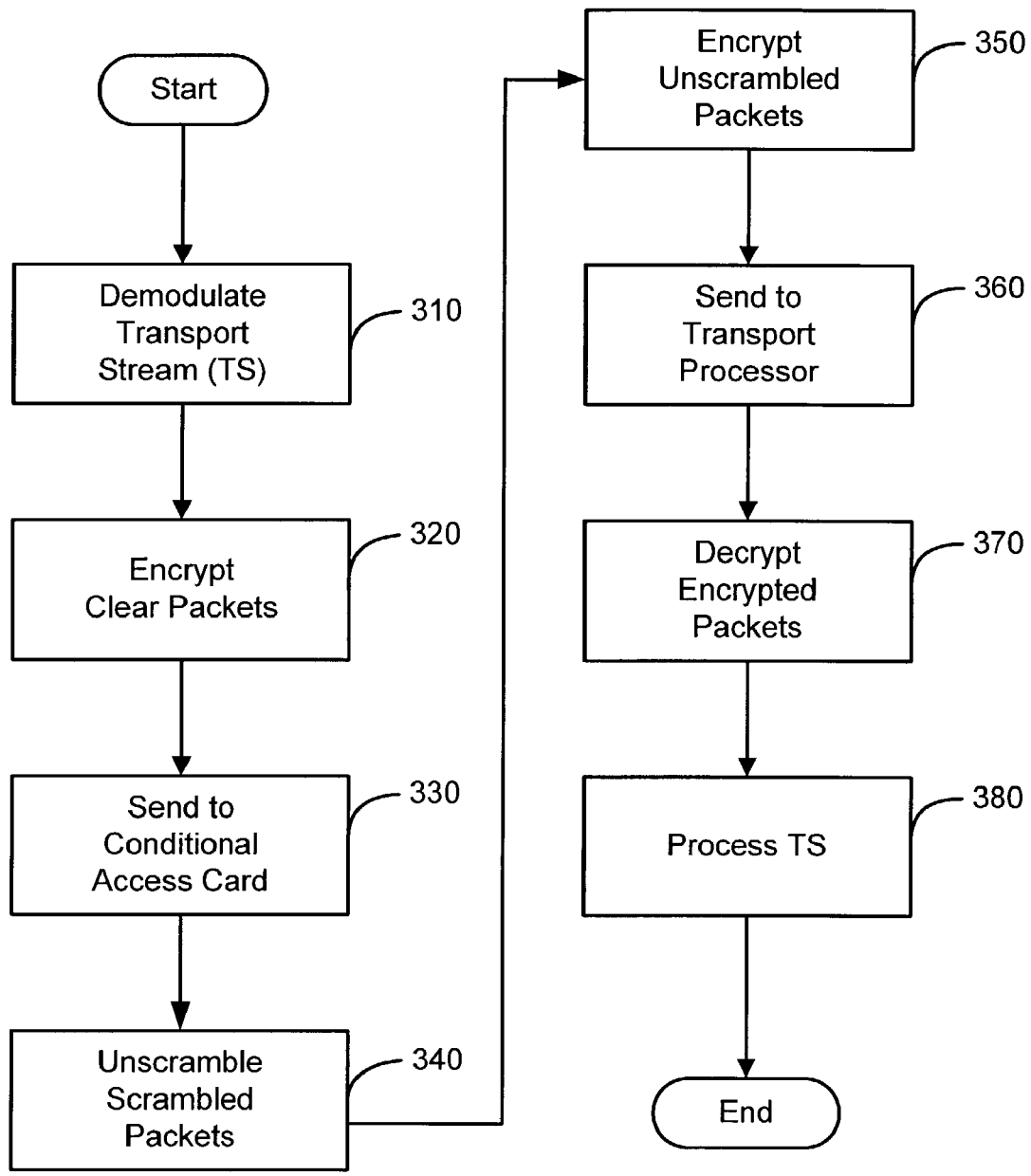
FIG. 5 shows a flowchart illustrating another example of a method that protects a transport stream according to the present invention.

FIG. 5 shows a flowchart illustrating another example of a method that protects a transport content stream according to the present invention. Referring to FIGS. 1, 4 and 5, the process begins, in step 310, by demodulating the transport stream received by the demodulator 140 of the receiver module 120 from the head-end module 110. In step 320, the copy protection encryption unit 150 copy protection encrypts the clear packets within the demodulated transport stream. In step 330, the transport stream, including copy protection encrypted packets and scrambled packets. is then sent to the conditional access card 170 via the common interface. In step 340, the conditional access decryption unit 200 decrypts (i.e., unscrambles) the conditional access encrypted packets (i.e., the scrambled packets) of the copy protection decrypted transport stream. The conditional access decryption unit 200 may unscramble all of the scrambled packets or may unscramble some of the scrambled packets. In step 350, the copy protection encryption unit 210 then copy protection encrypts the unscrambled packets (e.g., the scrambled packets that were unscrambled by the conditional access decryption unit 200) of the transport stream, before, in step 360, sending the copy protection encrypted transport stream to the transport processor 180 via the common interface 160. In step 370, the transport processor 180 then copy protection decrypts the copy protection encrypted packets of the received transport stream before, in step 380, processing the transport stream.

It is contemplated that any known conditional access and copy protection encryption schemes may be used in connection with the various embodiments of the present invention.

While the present invention has been described with reference to certain embodiments, it will be understood by those skilled in the art that various changes may be made, and equivalents may be substituted, without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention include all embodiments falling within the scope of the appended claims.

What is claimed is:

1. A system for protecting a transport stream content, comprising:
    a first module including a common interface; and
    a second module coupled to the first module via the common interface,
    wherein the first module is configured to demodulate an incoming transport stream, to copy protection encrypt the demodulated transport stream and to pass the copy protection encrypted transport stream to the second module via the common interface, and
    wherein the second module is configured to copy protection decrypt the transport stream received from the first module, to conditional access decrypt at least some of packets of the transport stream that were conditional access encrypted, to copy protection encrypt the transport stream and to pass the copy protection encrypted transport stream to the first module via the common interface.

2. The system according to claim 1, wherein the first module is configured to copy protection decrypt the transport stream received from the second module.

3. The system according to claim 2, wherein the first module is configured to copy protection decrypt the entire transport stream received from the second module.

4. The system according to claim 1, wherein the first module comprises a demodulator, a copy protection encryption unit and a processor, the demodulator being operatively coupled to the copy protection encryption unit, the copy protection encryption unit being operatively coupled to the common interface, and the processor being operatively coupled to the common interface.

5. The system according to claim 1, wherein the second module comprises a copy protection decryption unit, a conditional access decryption unit and a copy protection encryption unit, the common interface being operatively coupled to the copy protection decryption unit, the copy protection decryption unit being operatively coupled to the conditional access decryption unit, the conditional access decryption unit being operatively coupled to the copy protection encryption unit, and the copy protection encryption unit being operatively coupled to the common interface.

6. The system according to claim 1, wherein the first module is a receiver module comprising a set top box.

7. The system according to claim 1, wherein the second module is a conditional access card.

8. The system according to claim 1, wherein the common interface is user accessible.

9. A method for protecting a transport stream content of a conditional access system between a first module and a second module, comprising the steps of:
    (a) demodulating the transport stream received by a first module;
    (b) copy protection encrypting the demodulated transport stream;
    (c) passing the copy protection encrypted transport stream to the second module;
    (d) copy protection decrypting the transport stream received by the second module;
    (e) conditional access decrypting at least some of packets of the copy protection decrypted transport stream; and
    (f) copy protection encrypting the transport stream before passing the transport stream to the first module.

10. The method according to the claim 9, wherein the step of copy protection encrypting the demodulated transport stream includes the step of copy protection encrypting the entire demodulated transport stream.

11. The method according to claim 9, wherein the first module is a receiver module that comprises a set top box.

12. The method according to claim 9, wherein the second module is a conditional access card.

13. The method according to claim 9, further comprising the step of:
    (g) copy protection decrypting the transport stream received from the second module.

14. A system for protecting a transport stream content, comprising:
    a first module including a common interface; and
    a second module coupled to the first module via the common interface,
    wherein the first module is configured to demodulate an incoming transport stream, to copy protection encrypt packets of the demodulated transport stream that were not conditional access encrypted, and to pass the copy protection encrypted packets and to pass the conditional access encrypted packets of the transport stream to the second module via the common interface, and
    wherein the second module is configured to conditional access decrypt at least some of the packets of the transport stream that were conditional access encrypted, to copy protection encrypt the packets of the transport stream that were conditional access decrypted and to pass the transport stream to the first module via the common interface.

15. The system according to claim 14, wherein the first module comprises a demodulator, a copy protection encryption unit and a processor, the demodulator being operatively coupled to the copy protection encryption unit, the copy protection encryption unit being operatively coupled to the common interface, and the processor being operatively coupled to the common interface.

16. The system according to claim 14, wherein the second module includes a conditional access decryption unit and a copy protection encryption unit, the common interface being coupled to the conditional access decryption unit, the conditional access decryption unit being coupled to the copy protection encryption unit, the copy protection encryption unit being coupled to the common interface.

17. The system according to claim 14, wherein the first module is a receiver module comprising a set top box.

18. The system according to claim 14, wherein the second module is a conditional access card.

19. The system according to claim 14, wherein the common interface is user accessible.

20. A method for protecting a transport stream content of a conditional access system between a first module and a second module, comprising the steps of:
   (a) demodulating the transport stream received by a first module;
   (b) copy protection encrypting packets of the demodulated transport stream that were not conditional access encrypted;
   (c) passing the transport stream, including the copy protection encrypted packets, to the second module;
   (d) conditional access decrypting at least some of the packets of the transport stream that were conditional access encrypted; and
   (e) copy protection encrypting the packets of the transport stream that were conditional access decrypted before passing the transport stream to the first module.

21. The method according to claim 20, further comprising the step of:
   (f) copy protection decrypting the packets of the transport stream that were copy protection encrypted in step (b) and in step (e).

* * * * *